United States Patent Office 2,854,381
Patented Sept. 30, 1958

2,854,381

RESIN LAXATIVE TABLETS CONTAINING HYDROLYZED KERATIN

Martin Kuna, Westfield, N. J., assignor to Bristol-Myers Company, New York, N. Y., a corporation of Delaware No Drawing. Application December 8, 1955
Serial No. 551,717

13 Claims. (Cl. 167—82)

This invention pertains to laxative compositions and products and more particularly to a bulk laxative composition comprising a pH-sensitive gelling material such as a synthetic resin and a disintegrating agent for the resin.

Many types of laxative compositions are known and marketed, the principal ones being irritants, saline laxatives, emollients and bulk laxatives. All types suffer from inherent disadvantages. Thus, the irritant laxatives are effective by reasons of their irritant action upon the intestinal walls, which in turn increases the muscular contraction thereof to speed up elimination. Such irritation often results in an inflammation of the intestinal walls.

Saline laxatives attract water into the intestines to increase volume and fluidity but at the expense of varying degrees of body dehydration.

Emollient laxatives such as mineral oil and certain vegetable oils are effective lubricants but inhibit or prevent absorption of oil-soluble food components, such as the oil-soluble vitamins, through the intestinal walls.

Bulk laxatives are effective by reason of their ability to form a bulking mass or gel within the alimentary tract and to stimulate peristalsis by reason of the resulting mechanical distention of the intestine. A common objection of such bulk laxative materials is their tendency to gel prematurely in the stomach thereby producing an uncomfortable feeling of fullness. However, the present invention contemplates the use of a bulk laxative composition which overcomes the aforesaid objection in that it possesses the property of remaining fluid in a suspension having a pH of below about 4.5 and which is capable of forming a viscous gel at a pH of above about 4.5 and below about 10.0. Thus such a composition remains fluid while in the stomach which normally has a pH of less than 4.5 but forms a firm gel after passing through the pylorus into the intestine where the pH is normally above 4.5. Bulk laxatives having such properties may be incorporated into tablets which preferably include a disintegrating agent in order that the effective bulking agent may be readily and quickly released when the tablet is administered orally. Such a disintegrating agent should be one which does not in any way prevent the dispersion of the effective ingredient and which does not hinder the bulking or gelling action thereof. The disintegrating agent should also be such that it does not otherwise interfere with the normal physiological processes of the body. It is essential, of course, that all components of a bulk laxative composition be non-toxic.

It is, therefore, an object of the present invention to provide a novel bulk laxative composition which may be dispensed in a readily administered form in accurate dosages.

It is another object of this invention to provide a bulk laxative composition which may be administered in a convenient form and which does not assume its effective bulk form until after it has passed the stomach and has entered the duodenum.

It is a further object of the present invention to provide a bulk laxative tablet which is quickly disintegrated after oral administration in order that the effective bulking component may be completely freed for action immediately upon passing out of the stomach.

It is still another object of this invention to produce bulk laxative compositions and tablets of the above characteristics which are substantially non-toxic.

In accordance with the above objects, a preferred embodiment of the present invention comprises a bulk laxative tablet which includes, as the effecting bulking agent, a pH-sensitive resin, an aqueous colloidal suspension of which remains in a liquid form below a pH of about 4.5 and is capable of forming a viscous gel above a pH of about 4.5. A preferred resin of this type is a colloidally water-soluble polymer of acrylic acid cross-linked with from about 0.75% to about 1.5% of allylsucrose. The preferred embodiment of the present invention also includes, as a disintegrating agent, a finely divided proteinaceous material derived from a natural keratin-containing substance, such as chicken feathers. Such proteinaceous materials are prepared by heating the keratin-containing substance with a solution of about equal parts of water and a water-soluble, neutral aliphatic alcohol, such as methanol, ethanol, propanol, allyl alcohol, glycerol, etc. The proportions of reactants may be about 200 grams of keratinaceous substance per liter of solvent. The reaction is carried out, at a temperature between about 50° C. and about 150° C., preferably at about 80° C., in the presence of about 1% to 10% of a sulfur-containing, reductive disulfide-splitting agent such as sodium sulfite or sodium metabisulfite. Preferably sufficient alkaline material, for example, hydroxides of sodium, potassium, calcium, barium, etc., is added to give a final pH of from 7 to 9 to the reaction mixture. The proteinaceous material produced by such a reaction may be obtained as a finely divided precipitate by cooling the reaction mixture with or without the addition of a salt such as magnesium sulfate or lithium chloride. The precipitate may be dried and, if desired, the particle size thereof further reduced by milling. A detailed procedure for the preparation of a proteinaceous material of this nature is fully disclosed by U. S. Patent No. 2,474,339.

For the sake of brevity, a product made by the above procedure is hereinafter referred to as "keratin," or "partially degraded keratin," but it is to be understood that this product is not the same chemical substance as untreated natural keratin, but is, in fact, a substance having a much lower molecular weight than untreated keratin as a result of the splitting of a portion of the disulfide bonds of the original keratin, although it is not a product of the complete degradation of keratin to its constituent amino acids.

The bulking agents contemplated as usable in the bulk laxative compositions of the present invention include non-toxic, non-irritating colloidally water-soluble polymers of acrylic acid cross-linked with a polyhydroxy compound having at least 3 and preferably not more than about 8 hydroxyl groups, wherein the hydrogen atoms of at least three hydroxyl groups are replaced with unsaturated aliphatic radicals having two or more carbon atoms. Preferred radicals are those containing from two to four carbon atoms, e. g., vinyl, allyl or crotyl. These unsaturated radicals may themselves contain other substituents, such as the methyl group. For example, the methallyl radical is useful.

The polyhydroxy compounds useful in the formation of the cross-linking materials contemplated by the present invention preferably contain three or more hydroxyl groups and may include saccharides, for example, monosaccharides such as glucose, fructose, mannose or galactose and disaccharides such as sucrose, maltose or lactose. Other useful polyhydroxy compounds include polyhydroxy alcohols, such as glycerol, erythritol, dulcitol, mannitol, sorbitol, and pentaerythritol. The unsaturated cross-linkers described above are all ethers but I also contemplate the use, as cross-linking materials, of unsaturated esters, such as the triacrylic acid ester of glycerol or acrylic acid esters of sucrose having from 3 to 8 acid residues. Unsaturated ether-esters may also be used, but as in the case of unsaturated esters, are not preferred because of their tendency to hydrolyze in aqueous solutions.

The preferred cross-linking compounds are polyallyl sucrose, preferably containing from 5 to 8 allyl groups per sucrose molecule and polyallyl pentaerythritol preferably tetraallyl pentaerythritol.

In each case, the cross-linker preferably comprises from about 0.75% to about 1.5% by weight of the cross-linked material.

The synthetic resins comprising any of the aforementioned components are prepared by reacting a monomeric resin-forming material, such as acrylic acid, with a cross-linking material, in the presence of a catalyst, under autogenous pressure and in an inert atmosphere to inhibit oxidation. A suitable catalyst, for example, a peroxide, such as benzoyl peroxide or caproyl peroxide, is used in a concentration of from 0.1% to 2%. The reaction is carried out in the presence of an inert diluent which will not copolymerize with the reactants and which will not result in swelling of the polymerized product. Such diluents preferably should be solvents for the monomers but not for the polymers resulting from the reaction and may include water, alcohol, or saturated aliphatic or aromatic liquid hydrocarbons. Preferred diluents include such liquid hydrocarbons as benzene or toluene. However, solvents for the monomers are not essential, for the reaction may be conducted as an emulsion polymerization although this type of reaction is not preferred. The reaction is an exothermic one and may be carried out with simple agitation in a reactor provided with simple wall-cooling, the temperature being held between 20° C. and 70° C. The reaction temperature is not critical but if held much below 50° C., the rate of reaction may be quite slow, whereas if the temperature is allowed to go much above 50° C., the exothermic reaction may proceed too violently. The polymerization is carried as far toward completion as possible, the time required varying greatly with the reacting materials and other factors. If the reaction is carried out in the presence of an inert diluent as specified above, the progress of the reaction may be followed by periodically sampling the liquid phase and analyzing it for the presence of the free monomer. In such case, the reaction is determined to be complete when the percentage of monomer reaches a minimum concentration. In practice substantially all of the monomeric material is converted during the reaction to the polymeric form.

As an example of a specific product prepared in accordance with the above procedure, acrylic acid monomer and allyl sucrose, the latter being in a concentration of 1% by weight of the acrylic acid and averaging 5.8 or more allyl groups per molecule, were mixed in the presence of a toluene diluent and 1% of benzoyl peroxide and the reaction allowed to proceed to completion at which time the diluent, together with unreacted monomer and catalyst, was removed by filtration and subsequent volatilization from the solid polymeric residue. The polymer thereby obtained was in the form of a white powder having a bulk density of about 12 pounds per cubic foot. The exact molecular weight is, of course, unknown but analysis shows that the product has an equivalent weight (molecular weight per repeating unit) of about 77. The minimum molecular weight, as roughly determined from viscosity measurements, is probably about 200,000.

The viscosity of a resin, made in accordance with the foregoing procedure, was determined by the following procedure. A 2.5 gram sample of resin was sifted into 500 ml. of distilled water in a Waring Blendor run at low speed and mixed for three minutes. The resulting 0.5% colloidal solution was transferred to a one liter beaker and allowed to stand until the foam broke. The pH was then adjusted with ammonium hydroxide to 6.5–7.0, and the solution stirred for 30 seconds at 250 R. P. M. The resulting gel was allowed to stand for one hour at 25° C. and a viscosity test was then run with a Brookfield viscosimeter using a number 4 spindle at 60 R. P. M.

The above test was repeated eleven times, using for each of the tests a sample from a different lot of resin. The average viscosity was found to be 71±7 poises.

To illustrate the dependency of the gelling properties of these resins upon pH, a 1% colloidal solution of an allyl sucrose-cross-linked acrylic acid polymer was adjusted to a pH of 3.0 at which value a viscosity of 0.24 poise was obtained by a procedure similar to that used in determining the viscosity of the 0.5% solution described above. The pH of this 1% solution was then adjusted to 3.6 with dilute alkali, whereupon the viscosity was determined to be 2.64 poises. Increase of pH to 4.3 resulted in a viscosity of 65 poises and when the pH was further increased to 6.0, the resulting gel became so viscous that measurement of the viscosity became impossible. Decrease of pH to below about 4.5 caused the gel to return to a fluid form.

The particle size of the resins contemplated by the invention is controlled to a desired value by subjecting the fine resin precipitate to steam to agglomerate the resin and then milling it to the final desired particle size.

For example, a polyacrylic acid resin, cross-linked with allylsucrose and produced as described above, was placed in a shallow tray in an enclosed housing and treated with steam at a dry bulb temperature of 210° F. and a wet bulb temperature of 190° F. for 45 minutes, after which time the wet bulb temperature was reduced to 100° F. and heating was continued at a dry bulb temperature of 200° F. for another 80 minutes.

The resin subjected to the steaming process is chemically unchanged but is physically agglomerated into a porous cake which is then milled. The product of the milling procedure is screened and the material having a particle diameter greater than 40 mesh (0.015 inch) is retained for subsequent formulation. A typical particle size distribution of the milled resin used in the formulations of this invention is shown in Table I.

*Table I*

| Sieve Aperture Width | | | Percent Resin Retained On Sieve |
| --- | --- | --- | --- |
| Mesh | Inches | Microns | |
| 10 | 0.0787 | 2,000 | 23 |
| 20 | 0.0331 | 841 | 51 |
| 30 | 0.0232 | 590 | 16 |
| 40 | 0.0165 | 417 | 10 |

In contrast to the relatively large particle size of the steamed and milled polymer, the particle size of the untreated material is from about 10 to about 50 microns. Despite the increased particle size of the treated polymer, its bulk density is much greater than that of the untreated polymer. This is of great advantage in preparing pharmaceutical products for oral administration, for the increase of bulk density results in a decrease of volume for each unit of dosage required. Illustrative of the mentioned change in bulk density of the polymer, an untreated polymer of acrylic acid cross-linked with allyl sucrose was loosely filled into a volume of 1 cc. This volume of polymer weighed 0.210 gram. After steaming and milling in accordance with the process described hereinabove, the polymer had a bulk density of 0.591 gram per cc.

Tablets produced from the treated polymer possess a remarkable superiority over those produced from untreated polymer. This superiority is manifested in a firmer tablet, having a greatly reduced tendency to crumble, and in a dramatically reduced disintegration time when the tablets are placed in water.

A quantity of resin made and processed as described above and having the aforementioned physical characteristics, is mixed with from about 15 to about 40% by weight of powdered "keratin," i. e., the keratin-derived proteinaceous material described hereinabove, the "keratin" having an average particle size of from about 8 to about 20 microns.

Suitable medicinal tablets were prepared by mixing four parts by weight of resin with one part by weight of "keratin." This mixture was then tableted in a Colton 241 tablet press at a pressure of 4,000 pounds. The tablets so produced were 7/16 inch in diameter, weighed 0.551 gram and contained 0.441 gram of resin and 0.110 gram of "keratin." An effective dosage in the treatment of constipation was found to be a total of four to nine such tablets taken two to three times daily.

A tablet containing the aforementioned ingredients is disintegrated in the stomach with surprising and unexpected rapidity. The use of "keratin" as a disintegrating agent in combination with resins of the type contemplated by this invention gives results which are wholly unexpected in view of the properties of the single materials.

A common disintegrating agent for use in medicinal tablets is starch. However, tests have shown that "keratin" has a surprising superiority over starch when used in combination with the resins contemplated by the present invention. For example, resin-"keratin" and resin-starch tablets were made for the purpose of comparing the relative disintegration times of the tablets. The medium used was artificial gastric juice consisting of 1.0 gram of pepsin per liter of 0.1 N hydrochloric acid at a temperature of 37° C. The results of these experiments are shown in Table II.

*Table II*

| Percent Disintegrating Agent | Average Disintegration Time in Seconds | |
| --- | --- | --- |
| | Resin-"Keratin" | Resin-Starch |
| 20.0 | 35 | over 600 |
| 25.0 | 22 | over 600 |
| 30.0 | 22 | over 600 |
| 35.0 | 14 | over 600 |

In the case of each composition shown in Table II, the tablets were formed at pressures which resulted in tablets having approximately the same degree of hardness.

That the action of "keratin" in effecting the rapid disintegration of a tablet containing the resins contemplated by this invention is so much better than the disintegrating effect of starch with the same resins as to be wholly unexpected may be seen when the relative disintegrating effects of "keratin" and starch are observed in connection with tablets containing materials other than the resins of the present invention. Tables III, IV and V show the results of experiments run under similar conditions to the experiments illustrated in Table II. As in the experiments shown in Table II, those illustrated in Tables III, IV and V were done with tablets having about the same hardness.

*Table III*

| Percent Disintegrating Agent | Average Disintegration Time in Seconds | |
| --- | --- | --- |
| | Aspirin-"Keratin" | Aspirin-Starch |
| 1.25 | over 180 | over 180 |
| 2.5 | over 180 | over 180 |
| 5.0 | over 180 | 33 |
| 7.5 | 10 | 10 |
| 10.0 | 11 | 8 |

*Table IV*

| Percent Disintegrating Agent | Average Disintegration Time in Seconds | |
| --- | --- | --- |
| | Magnesium Hydroxide-"Keratin" | Magnesium Hydroxide-Starch |
| 5.0 | over 180 | over 180 |
| 7.5 | over 180 | over 180 |
| 10.0 | over 180 | 38 |
| 15.0 | over 180 | 17 |
| 20.0 | over 180 | 14 |
| 25.0 | 30 | 20 |

*Table V*

| Percent Disintegrating Agent | Average Disintegration Time in Seconds | |
| --- | --- | --- |
| | Magnesium Hydroxide-Resin-"Keratin" | Magnesium Hydroxide-Resin-Starch |
| 2.5 | 16 | 15 |
| 5.0 | 12 | 14 |
| 10.0 | 12 | 12 |
| 15.0 | 15 | 9 |
| 20.0 | 13 | 8 |

The results illustrated in Tables III, IV and V show that "keratin" possesses no advantage over starch as a disintegrating agent in the case of tablets wherein keratin and starch are respectively formulated with aspirin, magnesium hydroxide and magnesium hydroxide plus the resins contemplated by the present invention. In fact, in the usual case, "keratin" is less effective as a disintegrating agent than is starch.

The starch in each of the above experiments had a particle size such that 90% passed through a 325 mesh screen, i. e., 90% of the starch had a particle size less than about 43 microns. The "keratin" used in each of the above experiments had a particle size of 8-20 microns.

It is not known why "keratin" possesses such outstanding properties as a disintegrating agent when used with the resins specified in the present invention. It is known that, in the case of starch, the starch particles swell when contacted with water, thus causing a tablet in which the starch is incorporated to disintegrate. It is also known that, as is reflected in Table II, in the case of tablets containing starch and the resins contemplated by this invention, contact of the tablets with water results in a relatively impervious starch gel or capsule about the tablet which materially increases the disintegration time of the tablet. Visual observation shows that such encapsulation does not occur when "keratin" is substituted for starch. However, it is not known why the same relative efficiency or synergistic effect exhibited by "keratin" when mixed with the resins of this invention is not also exhibited when "keratin" is mixed with other materials. There is apparently a rapid and uniform hydration of the resin-"keratin" tablet from the surface to the interior. Electrostatic repulsion forces between the particles of the tablet when the latter is placed in water or an aqueous solution may play some part in the rapid disintegration of the tablet, but I do not wish to be bound by any particular theory of action.

The compositions of this invention are particularly suitable for oral administration in tablet form whereupon the table very quickly disintegrates, thus freeing the resin for immediate passage through the stomach into the intestine where its beneficial bulking action can take place. The formulated laxative compositions retain the desirable pH-sensitive gelling characteristics exhibited by the resins alone as shown by the values obtained from a viscosity test of a gel consisting of "keratin" and resin conducted in a manner in all other respects similar to the viscosity tests of resin alone, as described above. The viscosity values of various mixtures of "keratin" and resin are shown in Table VI.

Table VI

| "Keratin"/Resin Ratio | Viscosity (poises) |
|---|---|
| 0/1 | 70 |
| 1/4 | 57.2 |
| 1/1 | 44.9 |
| 4/1 | 26 |

Whereas the present disclosure has been directed primarily to laxative compositions in the form of tablets, it will be apparent to those skilled in the art that the beneficial aspects of the present invention may also be utilized in the form of powders or capsules for oral administration.

The terms employed herein are used as terms of description and not of limitation, and it is not intended thereby to exclude any equivalents of the features described, but it should be recognized that various modifications are possible within the scope of the invention claimed.

What is claimed is:

1. A bulk laxative composition in tablet form comprising a colloidally water-soluble polymer of acrylic acid cross-linked with an allylated polyhydroxy compound, said polymer, in an aqueous sol, being in a liquid form below a pH of about 4.5 and forming a viscous gel above a pH of about 4.5, and partially degraded keratin.

2. A bulk laxative composition in tablet form comprising a polymer of acrylic acid cross-linked with from about 0.75% to about 1.5% of a polyhydroxy compound having at least three hydroxyl groups wherein the hydrogen atoms of at least three hydroxyl groups are replaced with unsaturated aliphatic radicals, and a proteinaceous material produced by the partial chemical degradation of keratin.

3. A bulk laxative composition in tablet form comprising a non-toxic colloidally water-soluble polymer of acrylic acid cross-linked with a substituted polyhydroxy compound having at least three double bonds available for cross-linking purposes, and partially degraded keratin, said polymer having been subjected to the action of steam to form a porous cake, said cake then having been dried and milled to a predetermined particle size distribution.

4. A bulk laxative composition in tablet form comprising a non-toxic colloidally water-soluble polymer of acrylic acid cross-linked with an unsaturated ether having at least three double bonds available for cross-linking purposes, and partially degraded keratin.

5. A bulk laxative composition in tablet form comprising a non-toxic colloidally water-soluble polymer of acrylic acid cross-linked with an unsaturated saccharide ether having at least three double bonds available for cross-linking purposes, and partially degraded keratin.

6. A bulk laxative composition in tablet form comprising a non-toxic colloidally water-soluble polymer of acrylic acid cross-linked with polyallyl sucrose, and partially degraded keratin.

7. A bulk laxative composition in tablet form comprising a non-toxic colloidally water-soluble polymer of acrylic acid cross-linked with from about 0.75% to about 1.5% of polyallyl sucrose, and partially degraded keratin.

8. A bulk laxative composition in tablet form comprising a non-toxic colloidally water-soluble polymer of acrylic acid cross-linked with from about 0.75% to about 1.5% of polyallyl sucrose, and partially degraded keratin, the cross-linked polymer and the partially degraded keratin being present in a ratio of 4 parts by weight of the former to 1 part by weight of the latter.

9. A bulk laxative composition in tablet form comprising a non-toxic colloidally water-soluble polymer of acrylic acid cross-linked with a polyhydroxy compound wherein the hydrogen atoms of at least 3 hydroxyl groups are replaced with allyl groups, and partially degraded keratin.

10. A bulk laxative composition in tablet form comprising a non-toxic colloidally water-soluble polymer of acrylic acid cross-linked with a polyhydroxy alcohol wherein the hydrogen atoms of at least 3 hydroxyl groups are replaced with unsaturated aliphatic radicals, and partially degraded keratin.

11. A bulk laxative composition in tablet form comprising a non-toxic colloidally water-soluble polymer of acrylic acid cross-linked with polyallyl pentaerythritol, and partially degraded keratin.

12. A bulk laxative composition in tablet form comprising a non-toxic colloidally water-soluble polymer of acrylic acid cross-linked with from about 0.75% to about 1.5% of polyallyl pentaerythritol, and partially degraded keratin.

13. A bulk laxative composition in tablet form comprising a non-toxic colloidally water-soluble polymer of acrylic acid cross-linked with an unsaturated ester having at least 3 double bonds available for cross-linking purposes, and partially degraded keratin.

References Cited in the file of this patent

UNITED STATES PATENTS

| 2,474,339 | Ward | June 28, 1949 |
| 2,541,142 | Zief | Feb. 13, 1951 |

OTHER REFERENCES

Martin: Am. J. of Digestive Diseases, vol. 21, No. 2, February 1954, pp. 44–45.